US008342591B2

(12) United States Patent
Birmingham

(10) Patent No.: US 8,342,591 B2
(45) Date of Patent: Jan. 1, 2013

(54) REMOVABLE SHADE FOR A STROLLER HOOD

(76) Inventor: Micaela Birmingham, Brooklyn, NY (US)

( * ) Notice: Subject to any disclaimer, the term of this patent is extended or adjusted under 35 U.S.C. 154(b) by 0 days.

(21) Appl. No.: 12/772,200

(22) Filed: May 1, 2010

(65) Prior Publication Data

US 2010/0283293 A1 Nov. 11, 2010

Related U.S. Application Data

(60) Provisional application No. 61/215,796, filed on May 11, 2009.

(51) Int. Cl.
*B62B 5/08* (2006.01)
(52) U.S. Cl. ............... 296/97.21; 296/77.1; 296/111; 135/88.02; 297/184.13; 280/642
(58) Field of Classification Search ........... 296/97.21, 296/111–113; 135/88.02; 5/416; 297/184.13; 280/642
See application file for complete search history.

(56) References Cited

U.S. PATENT DOCUMENTS

| 706,854 | A | * | 8/1902 | Schulze | 296/36 |
|---|---|---|---|---|---|
| 4,566,729 | A | * | 1/1986 | Magnino | 296/159 |
| 5,542,732 | A | | 8/1996 | Pollman | |
| 5,975,558 | A | | 11/1999 | Sittu | |
| 6,012,756 | A | | 1/2000 | Clark-Dickson | |
| 6,908,148 | B2 | * | 6/2005 | Wang et al. | 297/184.13 |
| 7,052,085 | B2 | * | 5/2006 | Hoey-Slocombe et al. | 297/219.12 |

FOREIGN PATENT DOCUMENTS

JP 2006-21737 * 1/2006

* cited by examiner

*Primary Examiner* — Dennis Pedder
(74) *Attorney, Agent, or Firm* — Darrell L. Pogue; Keohane & D'Alessandro, PLLC

(57) ABSTRACT

A stroller covering including a removable cover shade is provided. Embodiments of this invention are directed to a removable shade for a stroller hood or bassinet hood to shield a stroller occupant (i.e., an infant or child) from rain, snow, sunlight, noise, etc., while allowing his/her caregiver quick and easy access to the child. In these embodiments, the removable shade comprises a curtain configured to cover an opening formed by the stroller hood, and a flange extending from the curtain for engaging a surface of the stroller hood.

12 Claims, 4 Drawing Sheets

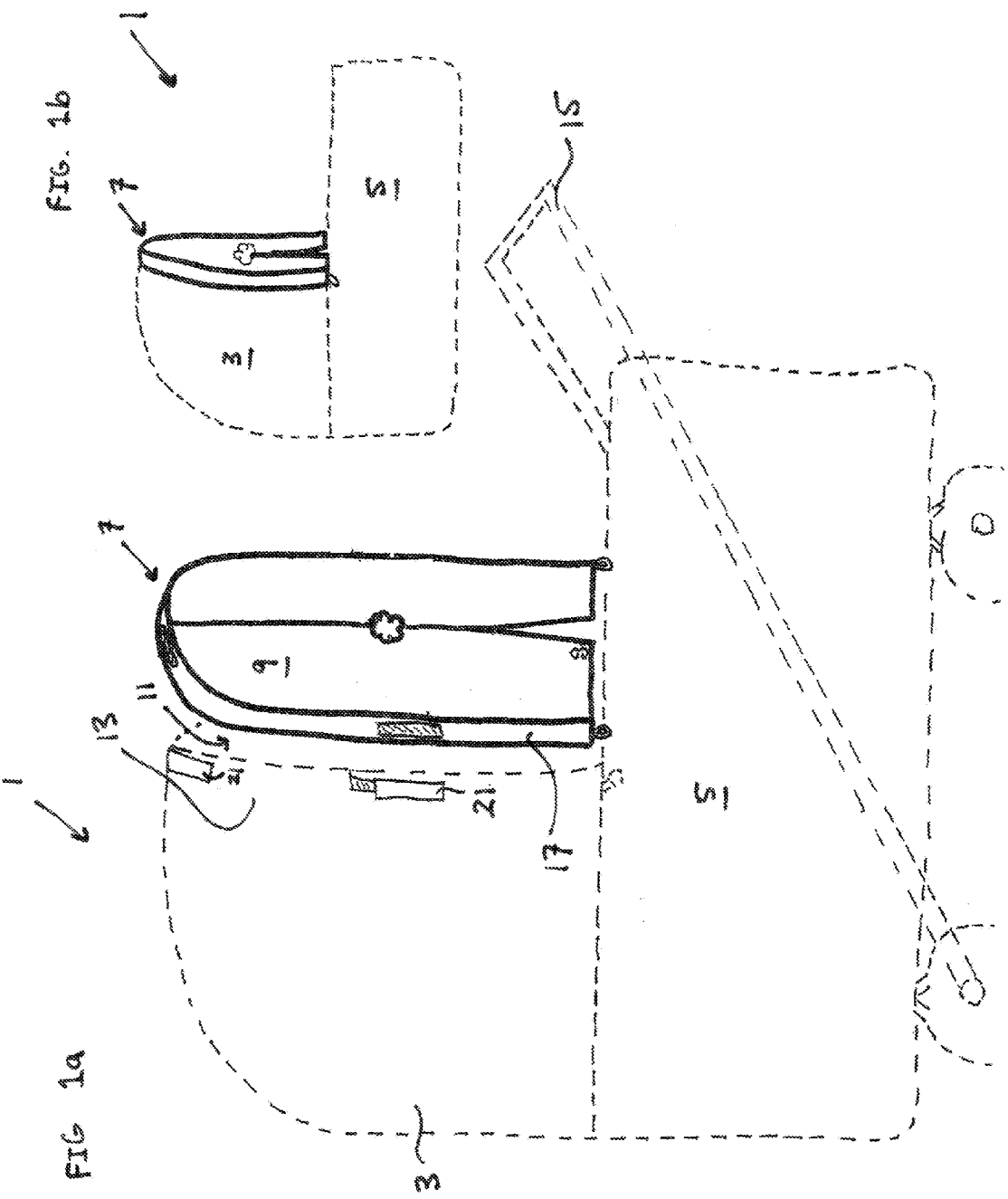

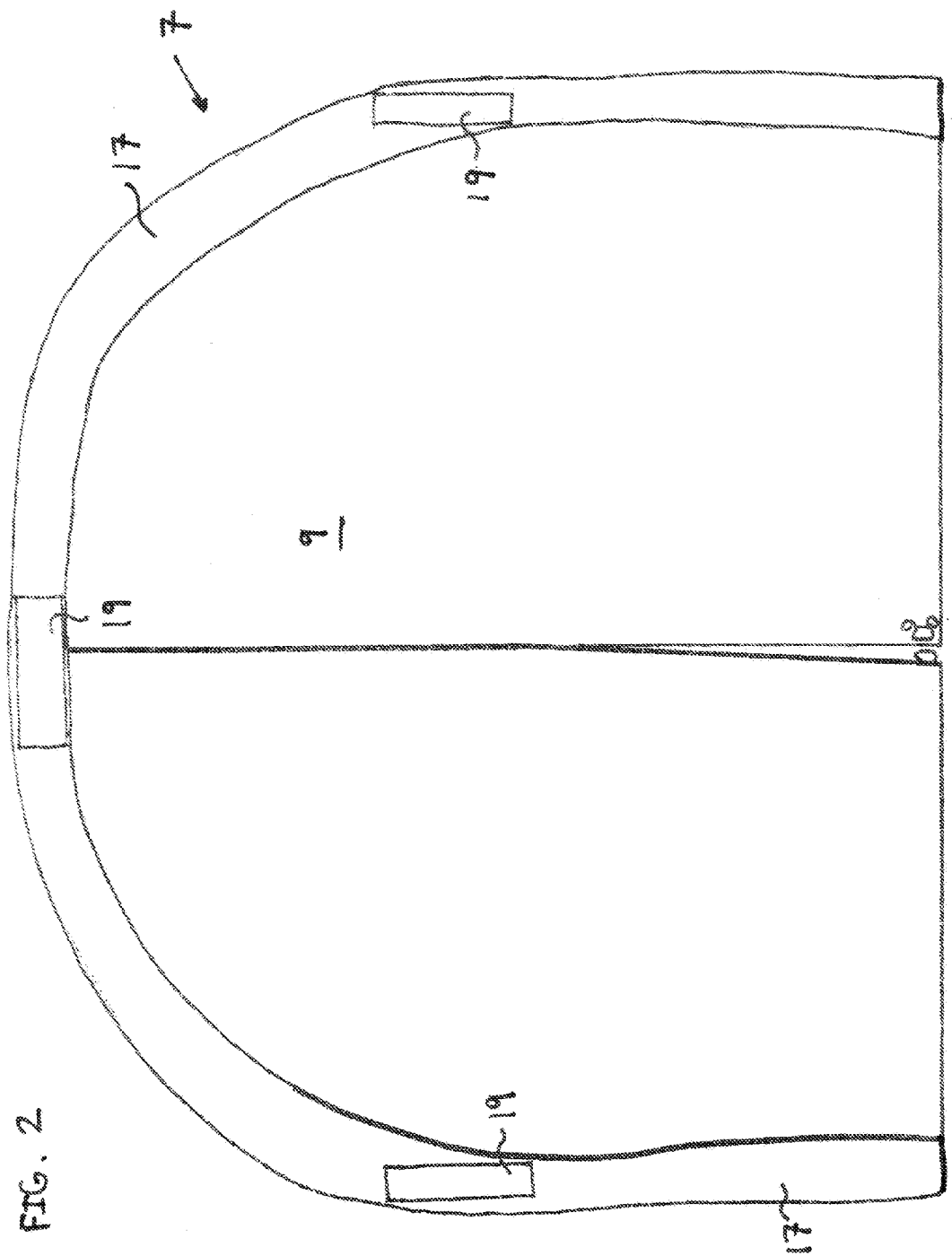

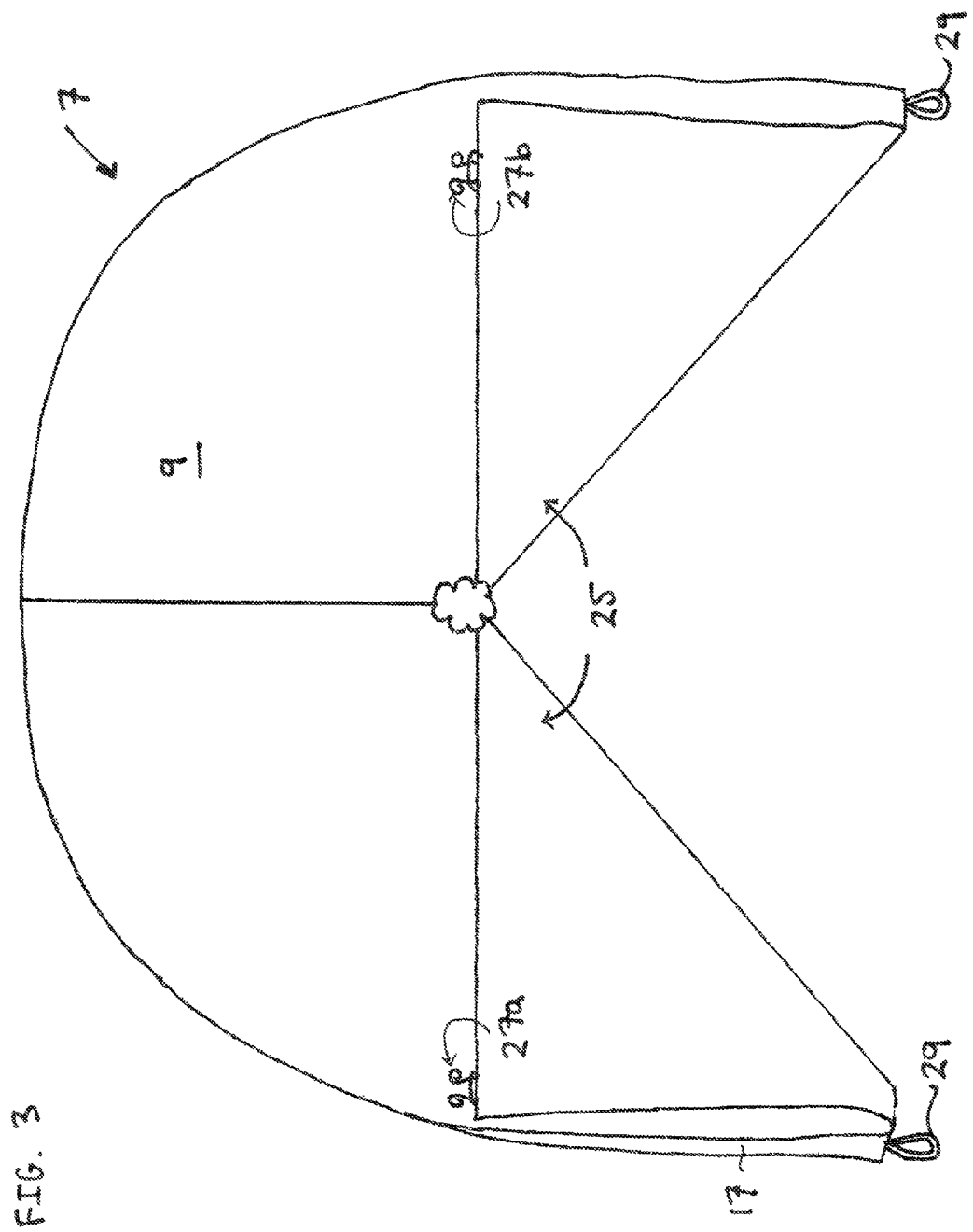

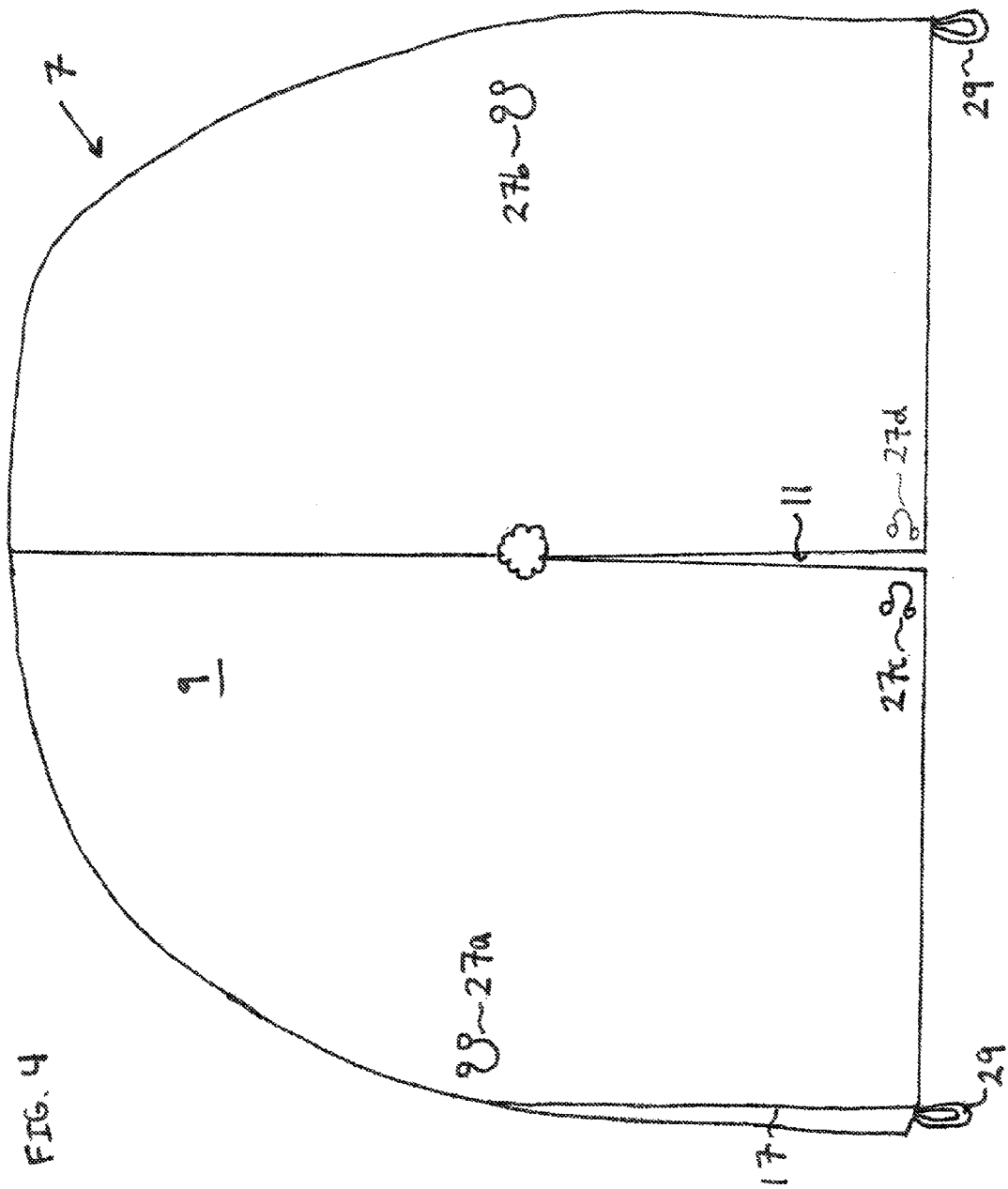

REMOVABLE SHADE FOR A STROLLER HOOD

CROSS-REFERENCE TO RELATED APPLICATION

The current application claims the benefit of U.S. Provisional Application No. 61/215,796 filed May 11, 2009, which is hereby incorporated herein by reference.

FIELD OF THE INVENTION

This invention relates generally to infant strollers and more specifically to the use of stroller hoods and shades to provide shelter to an occupant of the stroller.

BACKGROUND OF THE INVENTION

In many infant and child strollers on the market today, a hood, canopy, or shade is included on the stroller in order to shield the stroller occupant from rain, snow, sun, insects, noise, etc. As is well known in the art, various problems and difficulties have been encountered in providing suitable shading devices for protecting infants and children when they are exposed to weather elements.

Many conventional strollers have permanent canopies configured to protect the occupant. However, these canopies only protect the child from overhead (i.e., vertical) weather elements, and are ineffective for protecting the child occupant from lateral and reflected rays of sunlight. Moreover, as the stroller traverses, the lateral and reflected rays of sunlight come in different directions according to the direction in which the stroller travels, making it difficult for an adult to effectively protect the child by using temporary means, such as strategically placed blankets or other shields. Some strollers have permanent shields that are sized and configured to fit about the entire stroller. However, these shields can be large and cumbersome, and do not provide easy access to the child.

SUMMARY OF THE INVENTION

In one embodiment, there is an assembly comprising: a stroller hood covering a section of a stroller; and a removable shade having a curtain configured to cover an opening formed by the stroller hood, the removable shade coupled to a surface of the stroller hood.

In a second embodiment, there is a removable shade for a stroller hood. In this embodiment, the removable shade comprises: a curtain configured to cover an opening formed by the stroller hood; and a flange extending from the curtain for engaging a surface of the stroller hood.

In a third embodiment, there is a stroller cover comprising: a stroller hood configured to provide shelter to an occupant of a stroller; a curtain configured to cover an opening formed by the stroller hood; and a flange extending from the curtain for engaging a surface of the stroller hood.

BRIEF DESCRIPTION OF THE DRAWINGS

FIG. 1a shows a side perspective view of a removable shade detached from a stroller hood and stroller according to an embodiment of the invention;

FIG. 1b shows a side perspective view of the removable shade attached to the stroller hood and stroller of FIG. 1a according to an embodiment of the invention;

FIG. 2 shows a removable shade according to an embodiment of the invention;

FIG. 3 shows the removable shade of FIG. 2 having a set of flaps in an open position; and FIG. 4 shows the removable shade of FIG. 2 having the set of flaps in a closed position.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to a removable shade for a stroller hood or bassinet hood to shield a stroller occupant (i.e., an infant or child) from rain, snow, sunlight, noise, etc., while allowing his/her caregiver quick and easy access to the child. In these embodiments, the removable shade comprises a curtain configured to cover an opening formed by the stroller hood, and a flange extending from the curtain for engaging a surface of the stroller hood. In these embodiments, the removable shade is portable, lightweight, and adaptable to a variety of strollers and stroller hoods, as will be further described below.

FIGS. 1a-1b illustrate an assembly 1 including a stroller hood 3 covering a portion of a stroller 5, and a removable shade 7 having a curtain 9 configured to cover an opening 11 formed by stroller hood 3 and stroller 5. As shown in FIG. 1a, removable shade 7 is configured to attach/detach from stroller hood 3 and stroller 5. In an attached position (shown in FIG. 1b), removable shade 7 is coupled to a surface 13 of stroller hood 3. Stroller hood 3 couples to stroller 5 and is spaced above the stroller 5 to partially shield an occupant (i.e., a child) from overhead rain, snow, and sunlight. Stroller 5 also has a handle 15 for pushing stroller 5. Those skilled in the art will recognize that there are many different styles of strollers, and that stroller hood 3 and stroller 5 are described herein to clarify the discussion of removable shade 7. It will be understood that the specific shapes and dimensions of the stroller hood 3 and stroller 5 are exemplary, and that removable shade 7 of the present invention is adaptable for use with any number of commercially available stroller and stroller hood types, including but not limited to: Bugaboo® Frog, Bugaboo® Chameleon (trademark of ROYALTY BUGABOO GMBH LTD LIAB CO SWITZERLAND), UppaBaby® Vista (trademark of MONAHAN PRODUCTS, LLC in the United States), STOKKE™ XPLORY® (trademarks of Stokke AS, a Norwegian company), ICandy® (trademark of S.C.S (London) Limited, a company registered in England and Wales), Peg Perego, etc. Furthermore, although removable shade 7 is shown as having an inverted U-shape in FIGS. 1-4, it is appreciated that removable shade 7 can be nearly any shape depending on the specific stroller hood.

As shown in FIG. 2, removable shade 7 comprises a flange 17 extending from curtain 9 for engaging surface 13 of stroller hood 3. Flange 17 extends along an outer edge of curtain 9, and comprises a set (i.e., one or more) of flange fasteners 19 for engaging a set of hood fasteners 21 (FIG. 1a) to secure flange 17 and curtain 9 to stroller hood 3. Flange 17 and curtain 9 are reversible, and can be oriented to compliment the position of hood fasteners 21. As shown in FIG. 1a, stroller hood 3 has set of hood fasteners 21 attached to surface 13 of stroller hood 3. Surface 13 can be an outside surface or an inside surface of stroller hood 13, as set of hood fasteners 21 is detachable. As such, a user may select the location and position for set of hood fasteners 21. In one embodiment, set of hood fasteners 21 is attached to an outside surface of stroller hood 3 (i.e., the surface exposed to overhead rain, snow, and sunlight), wherein set of flange fasteners 19 is on an inside surface of flange 17 (i.e., the surface of flange 17 and curtain 9 facing opening 11). During use, flange 17 is placed over surface 13 and coupled to stroller hood 3, as shown in FIG. 1*b*. In another embodiment, set of hood fasteners 21 is attached to an inside surface of stroller hood 3 facing the occupant of stroller 5, wherein set of flange fasteners 19 is on an outside surface of the flange (i.e., the surface of flange 17 and curtain facing a caregiver and away from opening 11). In this configuration, flange 17 is coupled to the underside surface of stroller hood 3.

In one embodiment, set of flange fasteners 19 and set of hood fasteners 21 comprise hook and loop fasteners, such as those marketed under the trademark VELCRO™ and equivalents, to provide ease and flexibility of fastening. However, in other embodiments, set of flange fasteners 19 and set of hood fasteners 21 may comprise any number of fastening types including, but not limited to: mechanical clasps, magnets, zippers, clips, buckles, snaps, hooks, etc. It will be appreciated that any number of flange and hood fastener combinations and locations are possible within the scope of the invention.

Referring now to FIGS. 3-4, removable shade 7 will be described in greater detail. As shown, curtain 9 comprises a set of flaps 25, wherein each flap of set of flaps 25 includes a set of flap fasteners 27 for securing each flap of set of flaps 25 to curtain 9 when set of flaps 25 is an open position (FIG. 3), and for securing set of flaps together in a closed position (FIG. 4). Flap fasteners 27 comprise any number of fastening types including, but not limited to: hook/eye clips, mechanical clasps, magnets, zippers, buckles, snaps, hooks, hook and loop fasteners, etc. During operation, set of flaps 25 can be opened and secured by flap fasteners 27*a*, 27*b* to provide easy access to the occupant within stroller 5. When protection from the sun, wind, noise, etc., is desired, set of flaps 27*a*, 27*b* are disengaged from curtain 9 and brought to the closed position shown in FIG. 4. If desired, set of flaps 25 can be secured to each other by flap fasteners 27*c*, 27*d* positioned at the bottom of each flap.

As also shown in FIGS. 3-4, removable shade 7 further comprises a set of stroller fasteners 29 for coupling removable shade 7 to stroller 5. Set of stroller fasteners 29 may by used to provide additional support to removable shade 7, e.g., during windy conditions, by attaching to existing stroller hardware. Set of stroller fasteners 29 comprises any number of fastening devices, which may depend on the stroller model including, but not limited to: hook/eye clips, elastic, mechanical clasps, magnets, zippers, buckles, snaps, hooks, screws, hook and loop fasteners, etc.

To make removable shade 7 easily detachable and portable, removable shade 7 comprises a lightweight material. In one embodiment, curtain 9 and flange 17 are made from a lightweight fabric. Removable shade 7 may come in any number of different colored fabrics to complement the color of stroller hood 3. In one embodiment, different colors may be selected for each side of removable shade 7. It will be appreciated that removable shade can be any number of other materials including, but not limited to canvas, plastic, rubber, and/or other water impermeable materials. Furthermore, in another embodiment, curtain 9 and flange 17 may comprise multiple and/or different lightweight materials.

It is apparent that there has been provided a stroller covering comprising a stroller hood configured to provide shelter to an occupant of a stroller, a curtain configured to cover an opening formed by the stroller hood, and a flange extending from the curtain for engaging a surface of the stroller hood. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. An assembly comprising:
 a stroller hood covering a section of a stroller;
 a removable shade having a curtain configured to cover an opening formed by the stroller hood, the removable shade coupled to a surface of the stroller hood, wherein the curtain comprises a pair of flaps each including a set of flap fasteners for securing each flap to a front surface of the curtain when the pair of flaps is in an open position, the pair of flaps having a substantially inverted U-shape configuration in a closed position; and
 a flange extending substantially perpendicularly from the curtain for releasably engaging the surface of stroller hood via a set of flange fasteners coupled to the flange and a set of hood fasteners coupled to the stroller hood, the removable shade oriented substantially vertically.

2. The assembly according to claim 1, the set of flap fasteners further configured for securing the pair of flaps together in the closed position.

3. The assembly according to claim 1, wherein the set of flange fasteners and the set of hood fasteners comprise hook and loop fasteners.

4. The assembly according to claim 1, the removable shade further comprising a set of stroller fasteners for coupling the removable shade to the stroller.

5. The assembly according to claim 1, wherein the removable shade comprises a lightweight material.

6. A removable shade for a stroller hood, the removable shade comprising:
 a curtain configured to cover an opening formed by the stroller hood, wherein the curtain comprises a pair of flaps each including a set of flap fasteners for securing each flap to a front surface of the curtain when the pair of flaps is in an open position, the pair of flaps having a substantially inverted U-shape configuration in a closed position; and
 a flange extending from the curtain for engaging a surface of the stroller hood, the flange extending substantially perpendicularly from the curtain for releasably engaging the surface of stroller hood via a set of flange fasteners coupled to the flange and a set of hood fasteners coupled to the stroller hood, the removable shade oriented substantially vertically.

7. The removable shade according to claim 6, the set of flap fasteners further configured for securing the pair of flaps together in the closed position.

8. The removable shade according to claim 6, wherein the set of flange fasteners and the set of hood fasteners comprise hook and loop fasteners.

9. The removable shade according to claim 6, the removable shade further comprising a set of stroller fasteners for coupling the curtain to a stroller.

10. The removable shade according to claim 6, wherein the curtain and the flange comprise a lightweight material.

11. A stroller covering comprising:
 a stroller hood configured to provide shelter to an occupant of a stroller;
 a curtain configured to cover an opening formed by the stroller hood, wherein the curtain comprises a pair of flaps each including a set of flap fasteners for securing each flap to a front surface of the curtain when the pair of flaps is in an open position, and wherein the pair of flaps has a substantially inverted U-shape configuration in a closed position; and a flange extending from the curtain for engaging a surface of the stroller hood, the flange extending substantially perpendicularly from the curtain for releasably engaging the surface of stroller hood via a set of flange fasteners coupled to the flange and a set of hood fasteners coupled to the stroller hood, the removable shade oriented substantially vertically.

12. The stroller covering according to claim 11, the set of flap fasteners further configured for securing the pair of flaps together in the closed position.

* * * * *